No. 821,042.　　　　　　　　　　　　PATENTED MAY 22, 1906.
I. KITSEE.
TREATING CONTACT SUBSTANCES USED FOR CATALYTIC ACTION.
APPLICATION FILED FEB. 24, 1903. RENEWED NOV. 2, 1903.
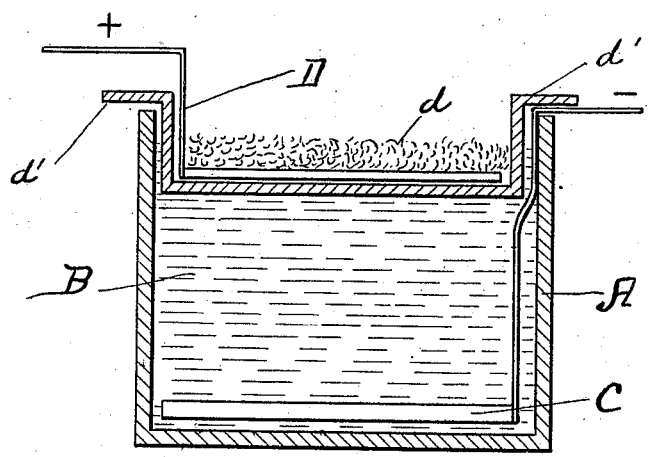
WITNESSES:
INVENTOR

UNITED STATES PATENT OFFICE.

ISIDOR KITSEE, OF PHILADELPHIA, PENNSYLVANIA, ASSIGNOR OF ONE-HALF TO C. L. HAMILTON AND W. F. HAMILTON.

TREATING CONTACT SUBSTANCES USED FOR CATALYTIC ACTION.

No. 821,042.     Specification of Letters Patent.     Patented May 22, 1906.

Application filed February 24, 1903. Renewed November 2, 1903. Serial No. 179,637.

*To all whom it may concern:*

Be it known that I, ISIDOR KITSEE, of the city and county of Philadelphia, State of Pennsylvania, have invented a certain new and useful Improvement in Treating Contact Substances Used for Catalytic Action, of which the following is a specification.

My invention relates to an improvement in treating contact substances used for catalytic action.

As is well known, sulfuric acid is now mostly manufactured by the so-called "contact process" from the sulfurous-acid gas generated now mostly from pyrites. It is also well known that no matter how carefully the gas is purified before coming in contact with the catalytic mass foreign substances, such as arsenic, are carried over to the contact or catalytic mass, thereby retarding the catalytic action often to such an extent that the mass becomes entirely useless.

To renovate the contact substances, which in most cases consist of finely-divided platinum, generally carried by a support, such as asbestos, the platinum in some cases is again dissolved in the combined acids—nitric and hydrochloric—and reduced with the aid of heat on the carrier. In some instances the platinum is treated with steam in combination with different gases, so as to restore again its activity. This process did not meet with entire success, and it is the aim of my invention to substitute for the processes used to-day a method whereby the foreign substances detrimental to the catalytic action of the contact mass are eliminated. Platinum, no matter in how finely a divided state, will not deteriorate, oxidize, or be otherwise dissolved in the electrolytic apparatus through the action of the electric current, whereas arsenic, mercury, phosphorus, antimony, and metals of the same class, substances known as "contact poisons" and generally injuriously affecting the catalytic action, are readily dissolved and oxidized in such an electrolytic apparatus no matter if the electrolyte of such cell consists only of diluted sulfuric acid; and my present invention relates to the application of electric currents on a contact substance exposed to contact poisons or having lost entirely its catalytic action or the catalytic action of which has been impaired through foreign substances, such as arsenic, mercury, phosphorus, &c.

Coming now to the practical application of my invention, it is preferred that the electrolytic apparatus should be constructed as follows: One electrode should consist of a platinum support, and the other electrode may consist of copper; but where the greater expense of platinum over copper is not too great a drawback both electrodes should consist of platinum. The first-named electrode should preferably be laid at the bottom of the cell in a manner so as to act as a support for the contact mass if no other support is present. It is preferred that the electrolytic apparatus should consist of two compartments, and the second electrode shall be placed in the second compartment. As an electrolyte sulfuric acid, chemically pure, may advantageously be employed. On top of the first-named electrode the contact mass to be purified shall be placed in a manner so that the same shall make an electrical contact with the electrode proper. This electrode serves as the anode of the apparatus and is connected to the positive pole of the charging-circuit. The second electrode serves as the cathode of the apparatus and is connected to the negative pole of the charging-circuit. The voltage needed is about from four to six volts, in accordance with the resistance of the apparatus and the greater or lesser amperage per square inch exposed. It is only necessary to send a current density through the apparaus equal to one ampere for each ounce of contact mass, and the time to purify the same entirely varies from one to three hours. I give these figures as experiments have proven; but it is obvious that the same may be altered to suit requirements in each and every particular case. In such instances where a great amount of contact mass has to be purified at one and the same time a number of such apparatus may be employed and may be connected in series with each other.

In the drawing, which illustrates in cross-section an electrolytic cell of a construction as preferably used, A is the containing vessel; B, the electrolyte; C, the negative electrode; D, the positive electrode; d, the contact mass to be purified, and d' the porous support for D and d. This porous support acts as a division for the apparatus and should contain part of the electrolyte. It is preferred that if the arrangement as illustrated is carried out the positive electrode D shall be formed of platinum wires in a manner so that the same shall form a network, this for the reason that if the contact would be solid throughout the electrolytic action would only be on the conductor and not on the contact mass, as desired.

It is obvious that an electrolytic apparatus may be constructed of any desired design, and the arrangement herein illustrated is given so as to enable persons not familiar with the construction of electrolytic apparatus to use this my invention.

If desired, the porous support may be dispensed with and the positive electrode placed at the bottom and the negative on top, or, if desired, the positive or negative electrode may be contained in a receptacle such as a porous cup.

It is not the aim of my invention to describe and make a particular kind of electrolytic apparatus, and I have selected, as said above, the form as illustrated because I found the same convenient in my experiments.

I have described the process of renovating contact substances with the aid of electric current; but it is obvious that this contact mass can be made the electrode of an electrolytic apparatus during the time of the production of the sulfuric acid, and it is further obvious that in such cases the destructive influence of the contact poison is entirely obviated.

I do not take into consideration in the latter arrangement the fact that the oxygen gases generated may be made useful and that the hydrogen gases generated may be carried off by any suitable means.

Having now described my invention, what I claim as new, and desire to secure by Letters Patent, is—

1. The process of regenerating contact substances for catalytic action which consists in subjecting said contact substances to the action of an electric current, said substances being made part of the anode of an electrolytic apparatus.

2. The process of reimparting to platinum contacts the catalytic power they formerly possessed, which consists therein that such platinum contacts are made part of the anode of an electrolytic apparatus at the same time at which a current of electricity is passed through said apparatus.

3. The process of reimparting to contact substances the catalytic activity impaired through "contact poisons" such as arsenic and the like, which consists in providing such contact mass with an electrode, placing said mass with its electrode in an electrolytic cell provided with a second electrode and causing currents of electricity to pass through said apparatus, the contact mass with its electrode being made the anode of said cell.

4. The process of eliminating the "contact poison" from contact masses, which consists in making said contact masses part of the anode of an electrolytic apparatus and sending at the same time currents of electricity through said apparatus.

5. The process of extracting the contact poison or poisons from contact masses used for catalytic action which consists in making said contact masses part of an electrode of an electrolytic apparatus and passing currents of electricity through said apparatus in a manner so that said contact poison shall be oxidized or dissolved out of said mass.

6. The method of preventing substances known as "contact poisons" from destroying the catalytic action of contact masses which consists in subjecting said masses to the electrolytic action of an electric current, said contact masses forming part of or being in contact with the anode of an electrolytic apparatus.

7. The process which consists therein that a contact mass is made part of the anode of an electrolytic apparatus during the time that gases, adapted to be oxidized through the catalytic action of said mass, are brought in contact with same, whereby the destructive influence of the contact poisons carried by said gases is counteracted.

In testimony whereof I hereby sign my name, in the presence of two subscribing witnesses, this 21st day of February, A. D. 1903.

ISIDOR KITSEE.

Witnesses:
 EDITH P. STILLEY,
 CHAS. KRESSENBUCH.